US006387541B1

(12) United States Patent
Gray et al.

(10) Patent No.: US 6,387,541 B1
(45) Date of Patent: May 14, 2002

(54) TITANIUM ARTICLE HAVING A PROTECTIVE COATING AND A METHOD OF APPLYING A PROTECTIVE COATING TO A TITANIUM ARTICLE

(75) Inventors: Simon Gray; Clive B. Ponton, both of Birmingham; Michael H. Jacobs, Worchester; Hugh E. Evans, Ashleworth, all of (GB)

(73) Assignee: Rolls-Royce plc, London (GB)

(*) Notice: Subject to any disclaimer, the term of this patent is extended or adjusted under 35 U.S.C. 154(b) by 0 days.

(21) Appl. No.: 09/557,870

(22) Filed: Apr. 24, 2000

(30) Foreign Application Priority Data

May 13, 1999 (GB) ............................................ 9911006

(51) Int. Cl.$^7$ ................................................ B32B 15/00

(52) U.S. Cl. ....................... 428/660; 428/681; 428/684; 428/685; 428/622; 428/628; 428/629; 428/632; 428/472; 428/472.1; 428/935; 428/937; 428/938; 428/939

(58) Field of Search ................................ 428/660, 681, 428/684, 685, 622, 628, 629, 632, 472, 472.1, 935, 937, 938, 939; 427/258, 405, 419.2, 419.7

(56) References Cited

U.S. PATENT DOCUMENTS

| | | | |
|---|---|---|---|
| 4,832,993 | A | 5/1989 | Coulon |
| 5,448,828 | A | 9/1995 | Willems et al. |

FOREIGN PATENT DOCUMENTS

| | | |
|---|---|---|
| EP | A2 0 816 007 | 1/1998 |
| EP | 0992613 | 4/2000 |
| GB | 810561 | 3/1959 |
| GB | 818184 | 8/1959 |
| GB | 826038 | 12/1959 |
| GB | 1094801 | 12/1967 |
| GB | 1186592 | 4/1970 |
| GB | 1 605 035 | 12/1981 |
| GB | 2 291 071 | 1/1996 |

*Primary Examiner*—Robert R. Koehler
(74) *Attorney, Agent, or Firm*—Oliff & Berridge, PLC

(57) ABSTRACT

A titanium aluminide turbine blade (10) includes an aerofoil (12), a platform (14) and a root (16). A protective coating (2) is applied to the aerofoil (12) and the platform (14) of the turbine blade (10). The protective coating (2) comprises austenitic stainless steel. A chromium oxide layer (22) is formed on the protective coating (2). The protective coating (20) and chromium oxide layer (22) provides oxidation and sulphidation resistance for the titanium aluminide article (10).

23 Claims, 2 Drawing Sheets

TITANIUM ARTICLE HAVING A PROTECTIVE COATING AND A METHOD OF APPLYING A PROTECTIVE COATING TO A TITANIUM ARTICLE

The present invention relates to a titanium article having a protective coating and a method of applying a protective coating to a titanium article, particularly to a titanium aluminide article having a protective coating and a method of applying a protective coating to a titanium aluminide article.

Titanium aluminide alloys have potential for use in gas turbine engines, particularly for turbine blades and turbine vanes in the low pressure turbine and compressor blades and vanes in the high pressure compressor and the combustion chamber diffuser section. The gamma titanium aluminides provide a weight reduction compared to the alloys currently used for these purposes.

However, titanium aluminide alloys and gamma titanium aluminide alloys will require environmental protective coatings, above a certain temperature, in a similar manner to conventional nickel base alloys or cobalt base alloys.

Conventional environmental protective coatings for nickel base alloys and cobalt base alloys include aluminide coatings, platinum coatings, chromium coatings, MCrAlY coatings, silicide coatings, platinum modified aluminide coatings, chromium modified aluminide coatings, platinum and chromium modified aluminide coatings, silicide modified aluminide coatings, platinum and silicide modified aluminide coatings and platinum, silicide and chromium modified aluminide coatings etc. Aluminide coatings are generally applied by the well known pack aluminising, out of pack, vapour, aluminising or slurry aluminising processes. Platinum coatings are generally applied by electroplating or sputtering. Chromium coatings are generally applied by pack chromising or vapour chromising. Silicide coatings are generally applied by slurry aluminising. MCrAlY coatings are generally applied by plasma spraying or electron beam physical vapour deposition.

Thermal barrier coatings include yttria stabilised zirconia and magnesia stabilised zirconia etc. Thermal barrier coatings are generally applied by plasma spraying or electron beam physical vapour deposition.

The MCrAlY coatings and aluminide coatings are intended to produce a continuous external alumina layer on the outer surface of the coatings. However, only an alpha alumina provides satisfactory oxidation resistance and alpha alumina is not readily formed below 1000° C. Additionally there is a problem of interdiffusion between the MCrAlY coating and the titanium aluminide and the MCrAlY coating and aluminide coatings have poor fracture toughness due to the high levels of aluminium which make them brittle. Chromium coatings formed by chromising are intended to produce a continuous external chromia layer on the outer surface of the coating. However, chromising produces a diffusion zone in the titanium aluminide article which is porous and thus not protective.

Accordingly the present invention seeks to provide a novel protective coating for a titanium article and a novel method of applying a protective coating to a titanium article.

Accordingly the present invention provides a titanium alloy article having a protective coating on the titanium alloy article, the protective coating comprising a coating of austenitic steel.

Preferably the protective coating comprises a chromia layer on the austenitic steel coating.

Preferably the protective coating comprises a silica layer between the austenitic steel coating and the chromia layer.

Preferably the titanium alloy article comprises a titanium aluminide, more preferably the titanium alloy article comprises a gamma titanium aluminide, an alpha 2 titanium aluminide or an orthorhombic titanium aluminide.

Preferably a barrier layer is arranged on the titanium alloy article and the austenitic steel coating is on the barrier layer.

Preferably the barrier layer comprises silica, titanium nitride, titanium aluminium nitride or alumina.

Preferably the titanium alloy article comprises a turbine blade, a turbine vane, a compressor blade, or a compressor vane.

Preferably the austenitic steel comprises austenitic stainless steel.

The present invention also provides a method of applying a protective coating to a titanium alloy article comprising depositing a coating comprising austenitic steel onto the titanium alloy.

Preferably the method comprises forming a chromia layer on the austenitic steel coating.

Preferably the method comprises forming a silica layer between the austenitic steel coating and the chromia layer.

Preferably the method comprises depositing the austenitic steel coating by physical vapour deposition, chemical vapour deposition, low pressure plasma spraying, air plasma spraying, high velocity oxy fuel plasma spraying, cladding, hot isostatic pressing, or electroplating.

Preferably the method comprises depositing the austenitic steel coating by sputtering.

Alternatively austenitic steel coating may be deposited by direct laser fabrication. The titanium alloy article may be formed by direct laser fabrication.

The whole of the titanium alloy article may be formed by a direct laser fabrication and subsequently the austenitic steel coating is deposited on the titanium alloy article by direct laser fabrication.

Each layer of the titanium alloy article and the austenitic steel coating may be formed by sequentially forming a layer of the titanium alloy article by direct laser fabrication and depositing the austenitic steel coating on the layer of the titanium alloy article by direct laser fabrication.

Preferably the titanium alloy article comprises a titanium aluminide, more preferably the titanium alloy article comprises a gamma titanium aluminide, an alpha 2 titanium aluminide or an orthorhombic titanium aluminide.

Preferably the method comprises depositing a barrier layer on the titanium alloy article and depositing the austenitic steel coating on the barrier layer.

Preferably the barrier layer comprises silica, titanium nitride, titanium aluminium nitride or alumina.

Preferably the titanium alloy article comprises a turbine blade, a turbine vane, a compressor blade, or a compressor vane.

Preferably the austenitic steel comprises austenitic stainless steel.

The present invention will be more fully described by way of example with reference to the accompanying drawings in which.

Figure 1:
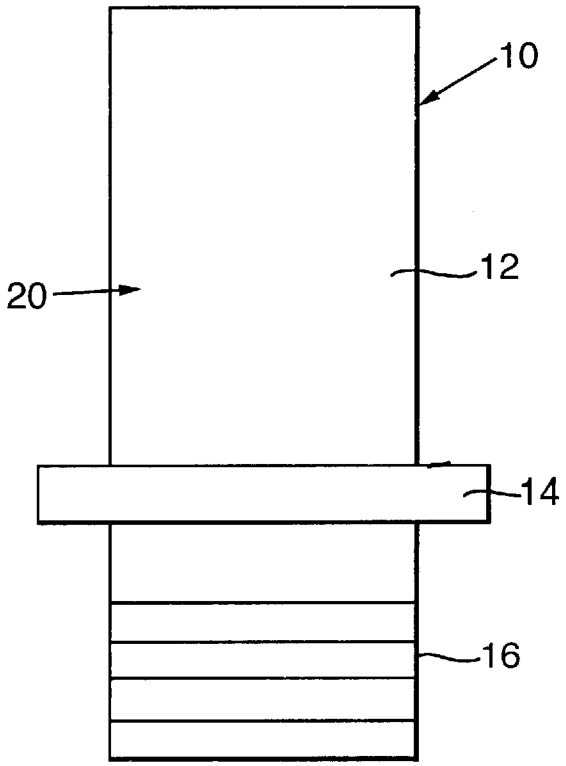
FIG. 1 shows a titanium aluminide turbine blade having a protective coating according to the present invention.

A gas turbine engine turbine blade 10, as shown in FIG. 1, comprises an aerofoil 12, a platform 14 and a root 16. The turbine blade 10 comprises a titanium aluminide, for example alpha 2 titanium aluminide, orthorhombic titanium aluminide and preferably gamma titanium aluminide.

An example of an alpha 2 titanium aluminide alloy comprises 14 at % Al, 19 at % Nb, 3 at % V, 2 at % Mo and 0.1 at % Fe and balance Ti plus incidental impurities. Examples of orthorhombic titanium aluminides alloys are (1) 22 at % Al, 25 at % Nb, 5 at % Ta, 3 at % Mo and balance Ti plus incidental impurities, (2) 23 at % Al, 13 at % Nb, 5 at % Ta, 3 at % Mo and balance Ti plus incidental impurities and (3) 23 at % Al, 21 at % Nb, 2 at % Mo, 0.35 at % Si and balance Ti plus incidental impurities. Examples of gamma titanium aluminide alloys are (4) 45 at % Al, 2 at % Mn, 2 at % Nb, 1 at % B and balance Ti plus incidental impurities, (5) 48 at % Al, 2 at %Mn, 2 at % Nb, 1 at % B and balance Ti plus incidental impurities, (6) 48 at % Al, 2 at %Cr, 2 at % Nb and balance Ti plus incidental impurities, (7) 46 at % Al, 5 at %Mn, 1 at % W and balance Ti plus incidental impurities, (8) 46.5 at % Al, 3 at % Nb, 2 at % Cr, 0.2 at % W and balance Ti plus incidental impurities.

The aerofoil 12 and the platform 14 of the turbine blade 10 have a protective coating 20. The protective coating 20 is preferably applied to all of the aerofoil 12 and that surface of the platform 14 which contacts the gas flowing through the turbine. Alternatively the protective coating 20 may be applied only to predetermined regions of the aerofoil 12 which suffer from corrosion or oxidation.

Figure 2:
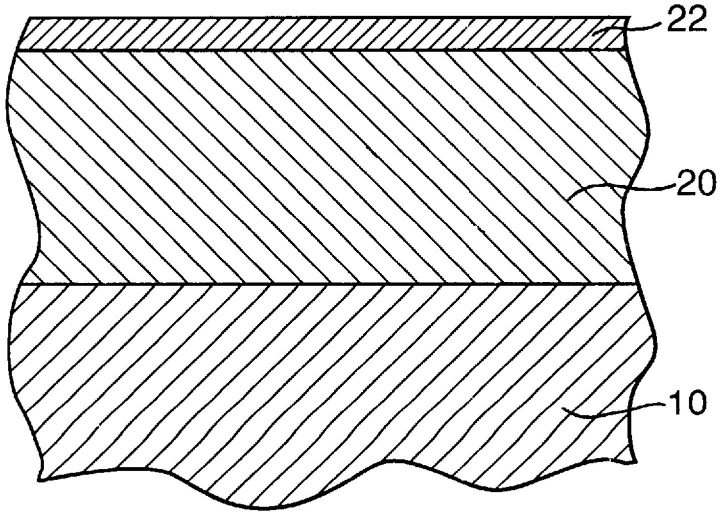
FIG. 2 is a cross-sectional view through the titanium aluminide turbine blade and protective coating according to the present invention.

The titanium aluminide turbine blade 10 and one embodiment of protective coating 20, is shown more clearly in FIG. 2.

The protective coating 20 comprises an austenitic stainless steel alloy coating. An austenitic stainless steel has a face centre cubic structure. It is believed that face centre cubic structures have greater toughness and ductility and improved ductile to brittle transition temperatures compared to the other stainless steel compositions having other structures. Additionally face centre cubic structures are more closely packed compared to the stainless steel compositions having other structures and it is believed that the face centre cubic structures have lower diffusion rates through them compared to the other structures.

A chromium oxide layer 22 forms on the austenitic steel protective coating 20. The chromium oxide layer 22 adheres to the austenitic stainless steel protective coating 20 and provides the corrosion and oxidation resistance. A silica layer may also be present between the chromium oxide layer 22 and the austenitic stainless steel protective coating 20 depending upon the amount of silicon in the stainless steel protective coating 20.

The protective austenitic stainless steel coating 20 is deposited onto the turbine blade 10 by argon shrouded air plasma spraying, low pressure plasma spraying, high velocity oxy fuel plasma spraying, cladding, hot isostatic pressing, electroplating, chemical vapour deposition or physical vapour deposition. The argon shrouded air plasma spraying is not a preferred method because it tends to produce a porous protective austenitic stainless steel coating 20 which also contains inclusions. Sputtering, particularly RF magnetron sputtering, is the preferred physical vapour deposition process because it produces a dense protective austenitic stainless steel coating 20.

The protective austenitic stainless steel coating 20 and chromium oxide layer 22 provides protection against high temperature turbine environments, i.e. material loss or degradation due to oxidation and or corrosion i.e. sulphate attack at temperatures of about 700° C. and above.

Figure 3:
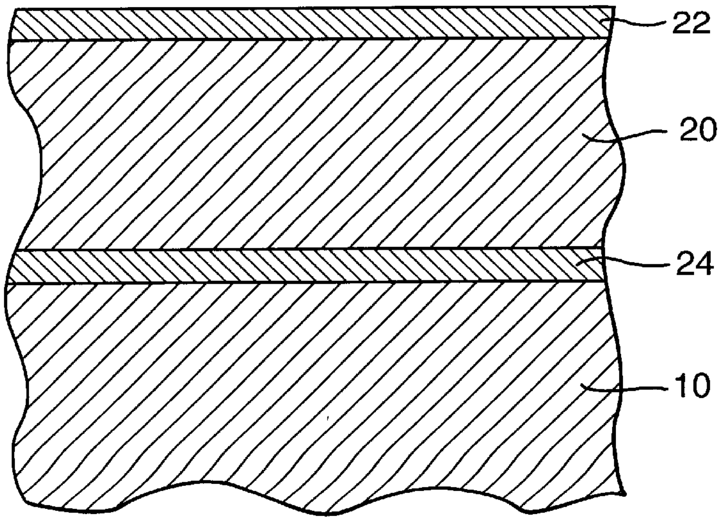
FIG. 3 is a cross-sectional view through the titanium aluminide turbine blade and an alternative protective coating according to the present invention.

The titanium aluminide turbine blade 10 and another embodiment of protective coating 20, is shown more clearly in FIG. 3.

The embodiment in FIG. 3 is substantially the same as that in FIG. 2 but differs in that a barrier layer 24 is provided between the titanium aluminide turbine blade 10 and the protective coating 20. The barrier layer 24 comprises silica, titanium nitride, titanium aluminium nitride or alumina. Other suitable barrier layers are aluminium, cobalt, nickel, iron, silicon, niobium and alloys or compounds of these elements. The barrier layer 24 prevents interdiffusion between the titanium aluminide 10 and the protective austenitic stainless steel coating 20 which may result in the formation of undesirable phases at the interface between the titanium aluminide 10 and the protective austenitic stainless steel coating 20.

EXAMPLE

In a series of tests the oxidation resistance of coated gamma titanium aluminide samples and uncoated gamma titanium aluminide samples were assessed. Samples of gamma titanium aluminide alloy comprising 45 at % Al, 2 at % Mn, 2 at % Nb, 1 at % B and the balance Ti plus incidental impurities were prepared. Some of the samples were coated with an austenitic stainless steel comprising 35 wt % Ni, 20 wt % Cr, 0.7 wt % Si and the balance Fe plus incidental impurities by argon shrouded air plasma spraying.

Some of the uncoated samples were oxidised in air at 800° C. for 200 hours in a furnace, some of the uncoated samples were oxidised in air at 900° C. for 500 hours in the furnace and some of the coated samples were oxidised in air at 900° C. for 500 hours in the furnace. The samples were weighed at intervals to determine the weight gain and hence the amount of oxidation.

Figure 4:
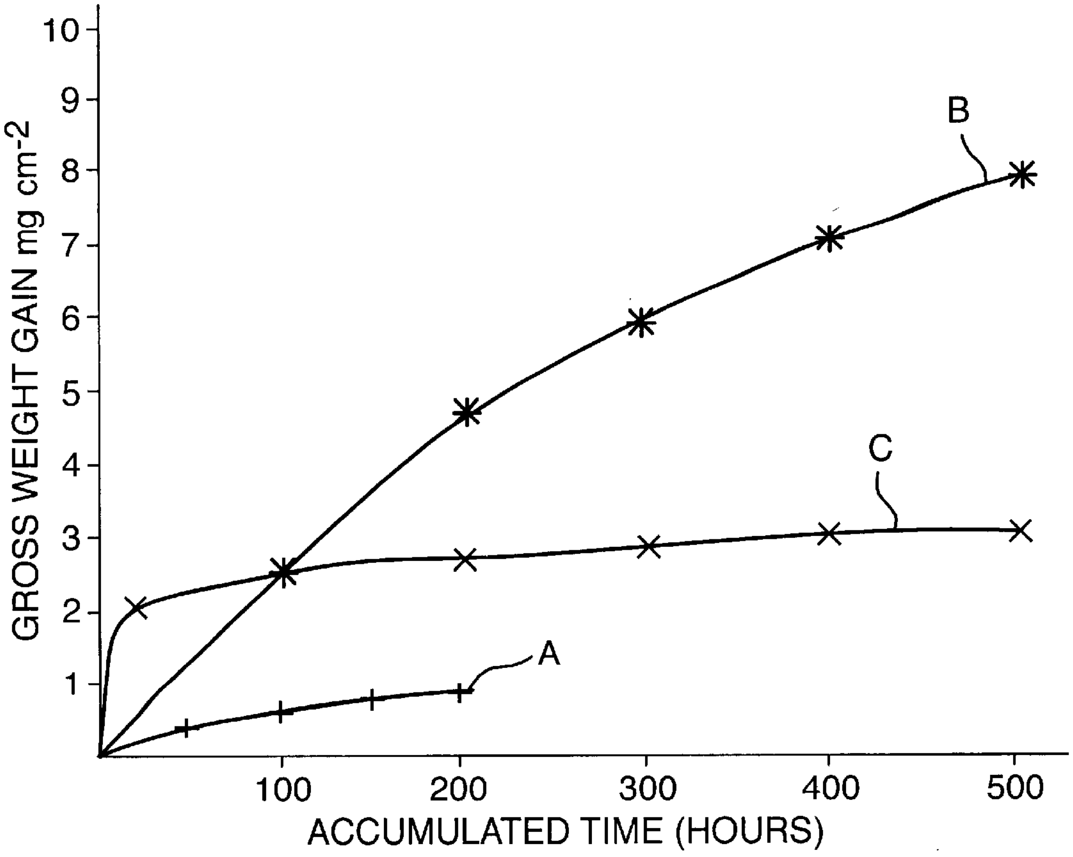
FIG. 4 is a graph showing mass change for coated and uncoated samples of gamma titanium aluminide after exposure in a furnace at 800° C. and 900° C.

FIG. 4 compares the weight gain of the uncoated samples heated at 800° C. and 900° C. in air and the coated samples heated at 900° C. in air. The uncoated samples heated at 800° C. are denoted by line A, the uncoated samples heated at 900° C. are denoted by line B and the coated samples heated at 900° C. are denoted by line C in FIG. 4. It can be clearly seen that the uncoated samples heated at 900° C. gain more weight than the uncoated samples heated at 800° C. and that the coated samples heated at 900° C. gain less weight than the uncoated samples heated at 900° C. Thus it is clear that the protective coating 20 is providing oxidation resistance for the gamma titanium aluminide samples 10.

A further method of producing the titanium alloy article with the protective coating comprises supplying titanium alloy powder in a controlled manner to the focal point of a laser beam. The titanium alloy powder is fused and consolidated by the laser beam and deposits onto a moveable substrate. The substrate is moved during the deposition of the titanium alloy in order to define the shape of the deposit and hence the shape of the titanium alloy article. Once the titanium alloy article is finished austenitic stainless steel alloy powder is supplied in a controlled manner to the focal point of the laser beam. The austenitic stainless steel alloy powder is fused and consolidated by the laser beam and deposits onto the surface of the titanium alloy article. The substrate is moved during the deposition of the austenitic stainless steel in order to deposit the austenitic stainless steel on all the surface requiring a coating. Thus the titanium alloy article is produced to near nett shape using direct laser fabrication and the austenitic stainless steel by laser cladding or direct laser fabrication.

A further method of producing the titanium alloy article with the protective coating uses a laser beam, a supply of titanium alloy powder, a supply of austenitic stainless steel powder and a control valve for the alloy powder.

The titanium alloy powder and austenitic stainless steel alloy powder are sequentially supplied into the focal point of the laser beam by the control valve as the substrate is moved to produce a single layer of the titanium alloy article with the austenitic stainless steel alloy protective coating. The process is then repeated to produce as many layers as required. A further method is to switch gradually between the titanium alloy powder and the austenitic stainless steel alloy powder to produce a graded interface between the titanium alloy article and the austenitic stainless steel protective coating.

Another method is to supply a silica, titanium nitride, titanium aluminium nitride or alumina powder sequentially with the titanium alloy powder and austenitic stainless steel alloy powder in the methods mentioned above to produce the barrier layer between the titanium alloy article and the austenitic stainless steel protective coating.

Although the invention has been described with reference to a single austenitic stainless steel alloy, any other austenitic steel may be used.

The protective coating of the present invention provides very effective protection for the titanium aluminide article. The protective coating of the present invention has the advantages of being relatively cheap and relatively easy to apply compared to conventional coatings.

Although the invention has been described with reference to a titanium aluminide intermetallic alloy, the present invention is also applicable to titanium alloys in general, for example beta titanium alloys.

We claim:

1. A titanium alloy article having a protective coating on the titanium alloy article, the protective coating comprising a coating of austenitic steel.

2. A titanium alloy article as claimed in claim 1 wherein the protective coating comprises a chromia layer on the austenitic steel coating.

3. A titanium alloy article as claimed in claim 2 wherein the protective coating comprises a silica layer between the austenitic steel coating and the chromia layer.

4. A titanium alloy article as claimed in claim 1 wherein the titanium alloy article comprises a titanium aluminide.

5. A titanium alloy article as claimed in claim 4, wherein the titanium alloy article is selected from the group consisting of a gamma titanium aluminide, an alpha 2 titanium aluminide and an orthorhombic titanium aluminide.

6. A titanium alloy article as claimed in claim 1 wherein a barrier layer is arranged on the titanium alloy article and the austenitic steel coating is on the barrier layer.

7. A titanium alloy article as claimed in claim 6, wherein the barrier layer is selected from the group consisting of silica, titanium nitride, titanium aluminum nitride and alumina.

8. A titanium alloy article as claimed in claim 1, wherein the titanium alloy article is selected from the group consisting of a turbine blade, a turbine vane, a compressor blade, and a compressor vane.

9. A method of applying a protective coating to a titanium alloy article comprising depositing a coating comprising austenitic steel onto the titanium alloy.

10. A method as claimed in claim 9 comprising forming a chromia layer on the austenitic steel coating.

11. A method as claimed in claim 10 comprising forming a silica layer between the austenitic steel coating and the chromia layer.

12. A method as claimed in claim 9 comprising depositing the austenitic steel coating by a method selected from the group consisting of physical vapour deposition, chemical vapour deposition, low pressure plasma spraying, air plasma spraying, high velocity oxy fuel plasma spraying, cladding, hot isostatic pressing and electroplating.

13. A method as claimed in claim 12, wherein the physical vapour deposition comprises sputtering.

14. A method as claimed in claim 9 comprising depositing the austenitic steel coating by direct laser fabrication.

15. A method as claimed in claim 14 comprising forming the titanium alloy article by direct laser fabrication.

16. A method as claimed in claim 14 comprising forming the whole of the titanium alloy article by direct laser fabrication and subsequently depositing the austenitic steel coating on the titanium alloy article by direct laser fabrication.

17. A method as claimed in claim 14 comprising forming each layer of the titanium alloy article and the austenitic steel coating by sequentially forming a layer of the titanium alloy article by direct laser fabrication and depositing the austenitic steel coating on the layer of the titanium alloy article by direct laser fabrication.

18. A method as claimed in claim 9, wherein the titanium alloy article comprises a titanium aluminide.

19. A method as claimed in claim 18, wherein the titanium alloy article is selected from the group consisting of a gamma titanium aluminide, an alpha 2 titanium aluminide and an orthorhombic titanium aluminide.

20. A method as claimed in claim 9 comprising depositing a barrier layer on the titanium alloy article and depositing the austenitic steel coating on the barrier layer.

21. A method as claimed in claim 20, wherein the barrier layer is selected from the group consisting of silica, titanium nitride, titanium aluminum nitride and alumina.

22. A method as claimed in claim in claim 9, wherein the titanium alloy article is selected from the group consisting of a turbine blade, a turbine vane, a compressor blade and a compressor vane.

23. A method as claimed in claim 9 wherein the austenitic steel is austenitic stainless steel.

* * * * *